Aug. 10, 1926.  1,595,165
R. POWELL
COMBINED LUGGAGE CARRIER AND FENDER BRACE
Filed August 22, 1923
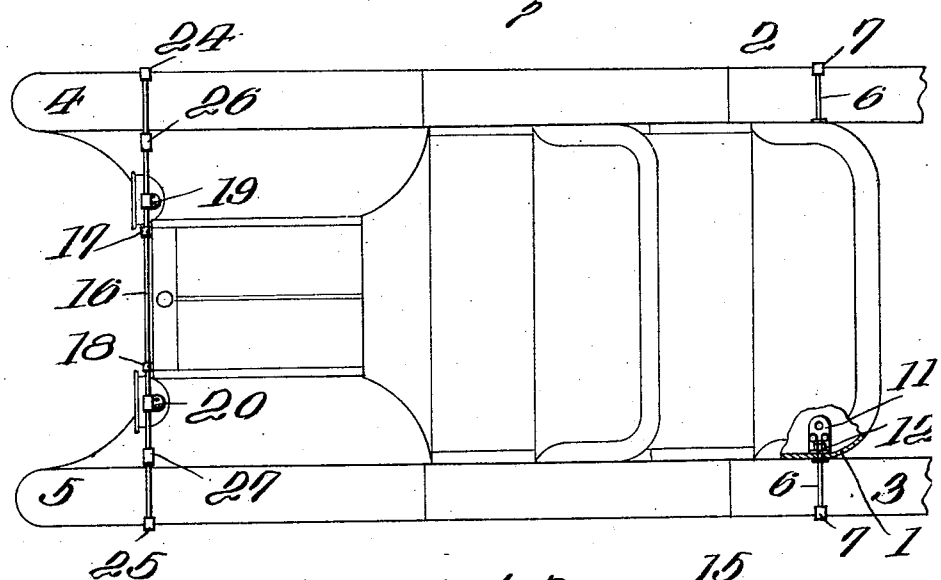
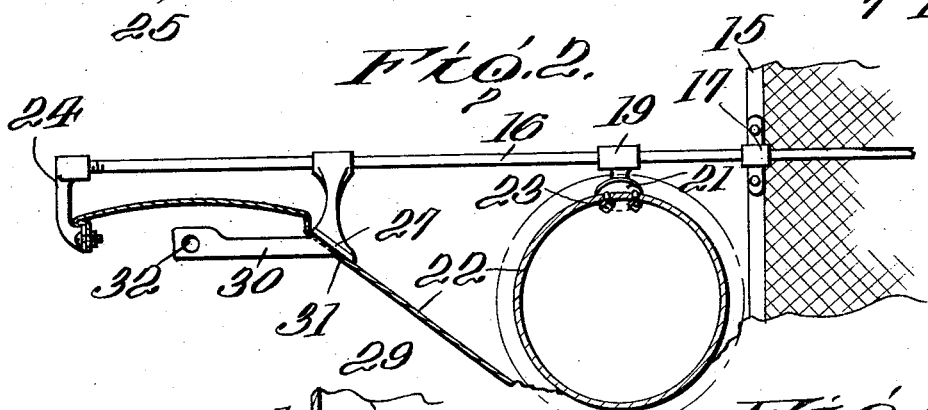
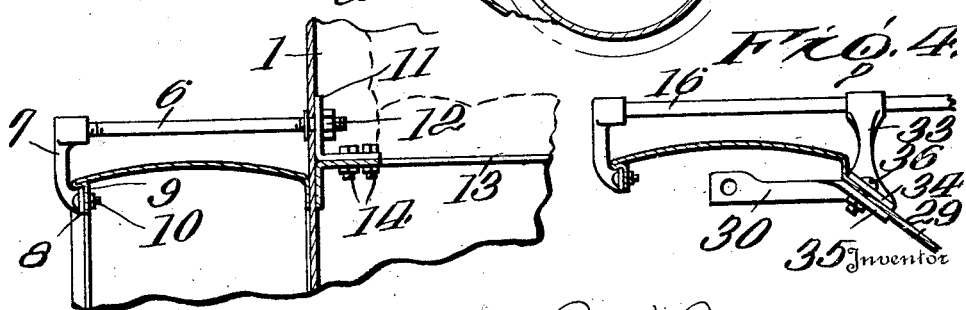

Patented Aug. 10, 1926.

1,595,165

UNITED STATES PATENT OFFICE.

RICHARD POWELL, OF NEW ORLEANS, LOUISIANA.

COMBINED LUGGAGE CARRIER AND FENDER BRACE.

Application filed August 22, 1923. Serial No. 658,774.

My invention relates to improvements in combined luggage carriers and fender braces.

The object of my invention is to provide a combined luggage carrier and brace for the rear and front fenders so arranged that luggage such as ladders, lumber, or any long article can be supported along the side of the vehicle above the fenders.

Another object of my invention is to provide a luggage carrier and brace of this character which can be readily applied to the ordinary automobile without any modification thereof and which will brace the fenders and at the same time support the luggage above the fenders so that the luggage will not mar or otherwise injure the fenders.

A further object of my invention is to provide a luggage carrier and brace for the fenders which will prevent rattling of the fenders when the luggage carrier is not being used and to also provide a simple, cheap and effective device having certain details of structure and combination of parts hereinafter more fully set forth.

In the accompanying drawings:

Figure 1 is a diagrammatic plan view of an automobile showing my invention applied thereto.

Figure 2 is a transverse sectional view partly broken away showing the attachment of the front bracket to one of the fenders, the lamp and the radiator.

Figure 3 is a transverse sectional view showing the attachment of the rear bracket to the fenders and body.

Figure 4 is a sectional view showing the modified form of attaching the bracket to the front fenders.

Referring now to the drawings; 1 represents the body of the motor vehicle, 2 and 3 the rear fenders and 4 and 5 the front fenders, all of which are arranged in the usual manner found in automobiles and motor trucks and all motor vehicles. 6 represents a bar having rigidly secured to its outer end the bracket arm 7 which extends downwardly and is curved inwardly and provided with an elongated horizontal flat portion 8 resting against the vertical flange 9 of a rear fender of the vehicle. Passing through this horizontal portion 8 and the vertical flange 9 of the rear fender is bolts 10 for rigidly securing the bracket arm 7 to the fender. The bar 10 extends through an opening in the body 1 of the vehicle and also passes through an L-shaped metal plate 11 and has a nut 12 screwed thereon for clamping it to the plate. The plate 11 is connected to some rigid portion 13 of the body by means of the bolts 14, all of which is clearly shown in Figure 3 of the drawings, it being understood that this construction is on each side of the vehicle.

Extending across the front of the vehicle in front of the radiator 15 is a bar 16 secured to the radiator by means of the clips 17 and 18 and said bar extending across the upper face of the front fenders 4 and 5 and spaced therefrom. Adjustably carried by the rod 16 are brackets 19 and 20 which extend downwardly and have obliquely arranged flat faces 21 adapted to conform with the shape of the rear of the headlight 22 and secured thereto by means of bolts 23. The outer ends of the rod 16 have secured thereto arms 24 and 25 constructed precisely like the arm 7 of the rear fender bar and attached in the same manner, and therefore, a detailed description of this attachment is omitted. Carried by the rod are two brackets 26 and 27 which extend downwardly and have an enlarged flat face 28 at its lower end arranged at an angle to correspond with that of the portion 29 of the front fender. The obliquely arranged portion 28 is provided with a horizontal thin bar 30 passing through an opening 31 in the portion 29 of the front fenders and has at its outer end an opening 32 adapted to receive the end of the bolt that locks the brace rod of the front fenders to the clips carried by the lower faces of the fenders.

In the modification shown in Figure 4 the bracket 33 has an enlarged flat portion 34 arranged the same as that shown in Figure 2, but instead of making the bar 30 integral therewith, it is made separate and is provided with an enlarged flat surface 35 adapted to engage the inner face of the portion 29 of the front fender and is locked thereto by means of bolts 36.

In the description of this application I have referred to the luggage carrier, meaning thereby any long articles such as step ladders, lumber, tent poles that are of a length to extend from the front to the rear fenders. While I have shown and described the specific means of attaching the bars to the rear and front fenders, it will be understood that I do not care to limit myself to these specific structures, as the same could be varied without departing from my invention.

Having thus shown and described my invention, what I claim is:—

1. The combination with a motor vehicle, of a bracket secured to the outer edge of each of the rear fenders and extending upwardly, a bar carried by the upper end of the bracket and extending through the body of the vehicle and secured to a fixed rigid portion thereof, a bar extending across the front of the vehicle and secured thereto and having its outer ends provided with members secured to the outer edges of the front fenders, and arms carried by the bar and secured to the under face of the front fender by the clip that secures the member rigid thereto.

2. The combination with a motor vehicle, of a bracket secured to the outer edge of a rear fender and extending across the same and spaced therefrom and secured to the body of the vehicle, of a bar extending across the vehicle in front of the radiator and secured to the radiator and having its outer ends extending across the front fenders and spaced from the outer face thereof and connected to the upper edges thereof, and arms carried by the bar and extending downwardly and secured to the outer edges of the fenders.

3. The combination with a motor vehicle, of a bracket secured to the outer edge of the rear fender and extending across the upper face and spaced therefrom, and means for securing the inner end of said bracket to the body of the vehicle, a bar extending across the vehicle in front of the radiator and secured thereto, arms carried by the bar and secured to the lamps of the vehicle, the outer ends of the bar extending across the upper faces of the fenders and spaced therefrom and having their outer ends secured to the outer edges of the fenders, and arms secured to the bar and having their lower ends secured to the inner edges of the fenders.

4. The combination with a motor vehicle, of brackets secured to the outer edges of the rear fenders and extending across their upper faces and spaced therefrom and secured to the body of the vehicle, of a bar extending across the vehicle in front of the radiator and secured to the body of the vehicle, the outer ends of the bar extending over the front fenders and spaced therefrom and having their outer ends secured to the outer edges of the front fenders, arms carried by the bar and secured to the fenders, and having outwardly extending portions secured to the clips that support the braces of the front fenders.

In testimony whereof, I affix my signature.

RICHARD POWELL.